(12) United States Patent
Branco

(10) Patent No.: US 10,521,342 B2
(45) Date of Patent: Dec. 31, 2019

(54) MEMORY ADDRESS DECODING PRIORITIZATION

(71) Applicant: Intel Corporation, Santa Clara, CA (US)

(72) Inventor: Rodrigo R. Branco, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 15/616,206

(22) Filed: Jun. 7, 2017

(65) Prior Publication Data
US 2018/0357163 A1 Dec. 13, 2018

(51) Int. Cl.
*G06F 12/06* (2006.01)
*G06F 12/10* (2016.01)

(52) U.S. Cl.
CPC .............. *G06F 12/06* (2013.01); *G06F 12/10* (2013.01); *G06F 2212/1041* (2013.01); *G06F 2212/202* (2013.01)

(58) Field of Classification Search
CPC ................................. G06F 12/06; G06F 12/10
See application file for complete search history.

(56) References Cited

U.S. PATENT DOCUMENTS

| | | | |
|---|---|---|---|
| 4,433,413 A | 2/1984 | Fasang | |
| 5,701,270 A | 12/1997 | Mohan Rao | |
| 2003/0154343 A1* | 8/2003 | Yokokawa | H03M 13/2703 711/5 |
| 2005/0086508 A1* | 4/2005 | Moran | G06F 12/1441 711/202 |
| 2006/0015772 A1* | 1/2006 | Ang | G06F 12/0284 714/6.32 |
| 2017/0004078 A1* | 1/2017 | Frazier | G06F 12/0269 |
| 2017/0185351 A1* | 6/2017 | Guim Bernat | G06F 12/0893 |

OTHER PUBLICATIONS

Kuyath, Stephen J., "Memory Decoding", http://webpages.uncc.edu/~sjkuyath/MC68000/decode.htm, Nov. 15, 2001, 11 pages.

* cited by examiner

*Primary Examiner* — Masud K Khan
(74) *Attorney, Agent, or Firm* — Lowenstein Sandler LLP

(57) ABSTRACT

System and methods for address decoding prioritization. An example processing system may comprise: a plurality of base address registers, wherein each base address registers specifies an address range and a decoding priority associated with the address range; and an address decoding circuit coupled to the plurality of base address registers, the address decoding circuit to: receive a memory address identified by a memory access transaction, and produce a decoded address by decoding the memory address using the plurality of base address registers in an order of respective decoding priorities.

20 Claims, 14 Drawing Sheets

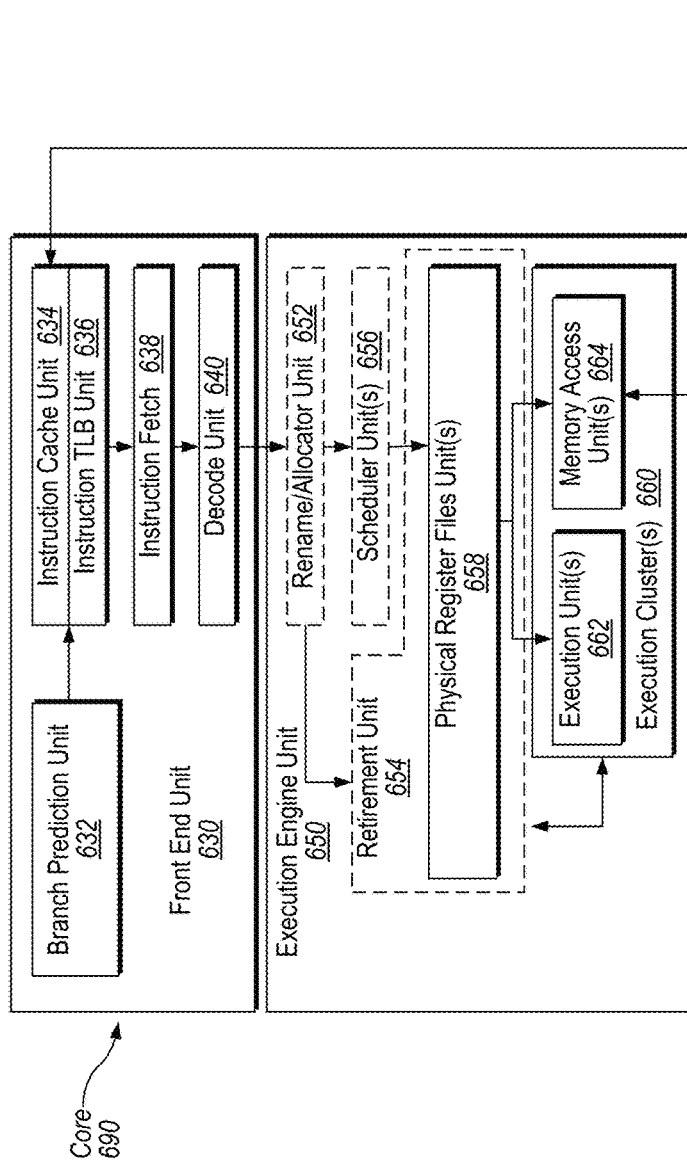
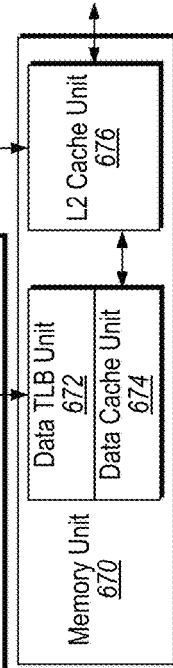
Fig. 6A
Fig. 6B

MEMORY ADDRESS DECODING PRIORITIZATION

TECHNICAL FIELD

The implementations of the disclosure relate generally to a computing device, and, more specifically, relate to memory address decoding prioritization.

BACKGROUND

In a computer system, address ranges of the global memory address space may be assigned to various devices, such as random access memory (RAM) and peripheral devices. In an illustrative example, a video adapter may have memory that is mapped into the system address space.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding.

FIG. 6A illustrates elements of a processor micro-architecture, in accordance with one or more aspects of the present disclosure.

FIG. 6B illustrates elements of a processor micro-architecture, in accordance with one or more aspects of the present disclosure.

DETAILED DESCRIPTION

Figure 1:
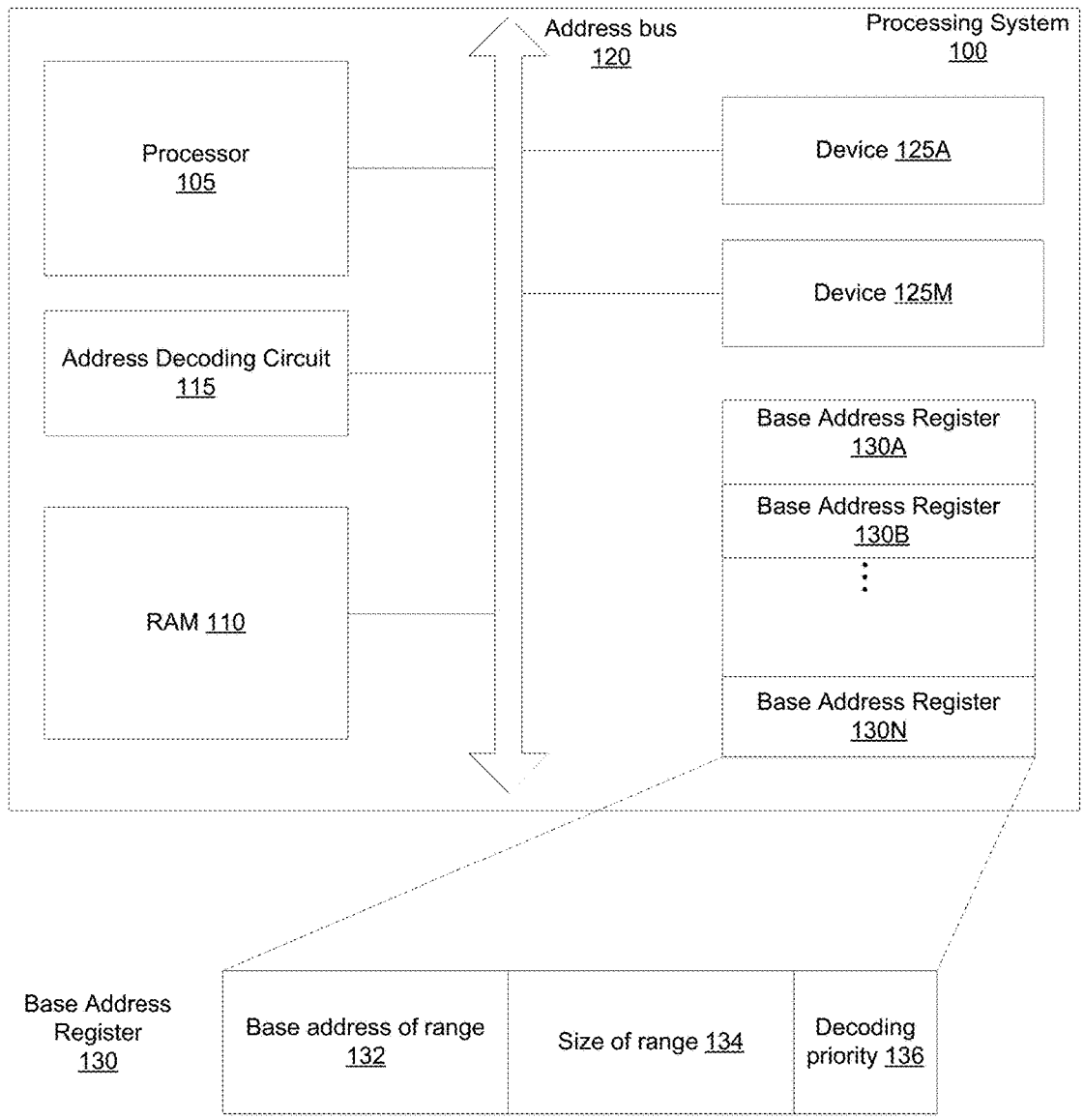
FIG. 1 illustrates an example processing system operating in accordance with one or more aspects of the present disclosure.

Described herein are systems and methods for memory address decoding prioritization.

In a computer system, address ranges of the global memory address space may be assigned to various devices, such as random access memory (RAM) and peripheral devices. Furthermore, address ranges may be assigned to various central processing unit (CPU) modes, such as the System Management Mode (SMM). One or more address decoding circuits may be employed to decode the addresses asserted on the address bus in order to select memory locations in the main memory or peripheral devices.

In certain implementations, a base address register may be associated with each hardware device that has physical memory to be mapped into the system address space and/or with each CPU mode that is capable of re-mapping memory regions. Each base address register may define the base memory address to be associated with the hardware device or CPU mode and may further define the size of the memory range to be mapped into the system address space. The mapping is performed by adding the base memory address to the offset within the local memory range of the hardware device, thus yielding a memory address that may be used in the system to refer to the particular memory location.

In certain systems, two or more physical devices may have memory ranges mapped into at least partially overlapping system address ranges. The overlapping address ranges may lead to unpredictable system behavior and/or compromise the security of privileged software and/or hardware modules associated with the overlapping memory ranges.

Implementations of the present disclosure overcome the above-noted and other deficiencies by enhancing the base address registers to store a system-wide decoding priority value associated with the address range specified by the base address register. The system-wide decoding priority defines the order in which the address decoding circuitry traverses the base address registers for performing a requested address decoding operation. Responsive to receiving a memory access transaction, the address decoding circuitry may sequentially traverse the base address registers in the order of their respective decoding priorities, until a base address register is identified such that the address referenced by the memory access transaction falls within the address range specified by the identified base address register. The address decoding circuitry may then use the identified base address register for decoding the address referenced by the memory access transaction.

Thus, even if overlapping memory ranges are specified by two or more base address registers, the address decoding circuitry would always be using the base address register having the highest priority value, thus eliminating the unpredictability of address decoding that would otherwise be caused by the overlapping ranges. In certain implementations, the highest decoding priorities may be assigned to address ranges associated with security-sensitive physical devices (e.g., the Software Guard Extensions (SGX) module) or security-sensitive modes of operation (e.g., the System Management Mode (SMM)).

In various implementations, the decoding priority values may be configurable by the firmware or privileged software (e.g., the basic input/output system (BIOS) or a device driver running with the context of the operating system (OS) kernel). Configurable decoding priorities allow utilizing the same hardware platform for different usage scenarios and/or market segments, e.g., for portable computers, mobile phones, and motor vehicles.

FIG. 1 illustrates an example processing system 100 that performs memory address decoding in accordance with one or more aspects of the present disclosure. In various illustrative examples, the processing system 100 may be implemented as a System-on-Chip (SoC), a mobile computing platform, or a server computing platform.

The processing system 100 may include a CPU 105, which may execute various tasks, such as system applications and user applications, using a system memory provided by RAM 110 to store the instructions of the programs and data associated with the programs.

The processing system 100 may further include an address decoding circuit 115 which may be utilized for decoding memory addresses that are asserted by memory access transactions on the address bus 120. In certain implementation, the address decoding circuit 115 may be implemented as a part of a memory controller. Alternatively, the address decoding circuit 115 may be implemented as a standalone component or may be integrated with another platform component. Decoding a memory address may involve identifying, for a given address specified by a memory access transaction, a physical device 125A-125M and the offset within the local memory range of the physical device. Examples of physical devices 125 include network interface controllers (NICs), video adapters, disk controllers, etc.

The processing system 100 may further include a plurality of base address registers 130A-130N. A base address register 130 may be associated with each hardware device 125 that has physical memory to be mapped into the system address space and/or with each CPU mode (e.g., the SMM) that is capable of re-mapping memory regions. While FIG. 1 schematically illustrates the base address registers 130A-130N as being located within a single array of registers, a base address register may be physically located on the associated physical device 125, within the CPU core or uncore, in the platform controller hub (PCH), or may be provided by an SMM register. Each base address register 130 may define the base memory address 132 to be associated with the hardware device or CPU mode, the size 134 of the memory range to be mapped into the system address space, and the decoding priority 136.

The decoding priorities 136 associated with a set of base address registers indicate the order in which the corresponding base addresses should be used for address decoding. In an illustrative example, the decoding priority may be specified by an integer value (e.g., ranging from 0 to 255) such that the smallest value indicates the highest decoding priority.

In various implementations, the decoding priority values 136 may be configurable by the firmware or privileged software (e.g., the basic input/output system (BIOS) or a device driver running with the context of the operating system (OS) kernel). For legacy software, which may be unaware of the decoding priority values stored by base address registers, those values may be initialized by the firmware during the system reset sequence. For legacy firmware, which may be unaware of the decoding priority values stored by base address registers, those values may be initialized as part of the platform manufacturing process.

Figure 2:
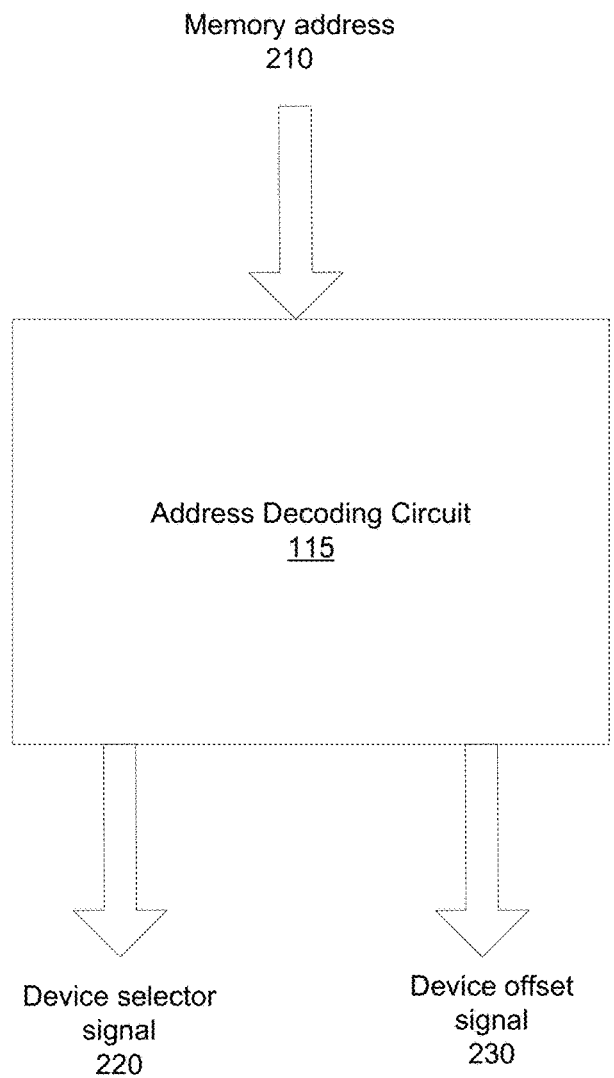
FIG. 2 schematically illustrates an address decoding circuit operating in accordance with one or more aspects of the present disclosure.

FIG. 2 schematically illustrates an address decoding circuit 115 operating in accordance with one or more aspects of the present disclosure. In an illustrative example, a memory access transaction may be initiated by an agent (e.g., the CPU 105) by asserting a memory address 210 on the address bus 120. Responsive to receiving the memory address, the address decoding circuit 115 may sequentially traverse the base address registers 130A-130N in the order of their respective decoding priorities 136. For each base address register, the address decoding circuit may attempt to match the address referenced by the memory access transaction to the address range specified by the base address and size of the range fields of the base address register. Responsive to identifying a base address register such that the address referenced by the memory access transaction falls within the address range specified by the identified base address register, the address decoding circuit 115 utilizes the identified base address register for decoding the address referenced by the memory access transaction. In an illustrative example, the address decoding circuit 115 may output a device selector signal 220 identifying the physical device associated with the identified base address register. The address decoding circuit 115 may further subtract the base address specified by the identified base address register from the address 210 referenced by the memory access transaction, and may output a device offset signal 230 specifying the offset within the local memory range of the hardware device.

Thus, even if overlapping memory ranges are specified by two or more base address registers 130A-130N, the address decoding circuit 115 would always be using the base address register 130 having the highest priority value, thus eliminating the unpredictability of address decoding that would otherwise be caused by the overlapping ranges. In certain implementations, the highest decoding priorities may be assigned to address ranges associated with security-sensitive modules (e.g., the Software Guard Extensions (SGX) module) or CPU modes (e.g., the System Management Mode (SMM)).

Figure 3:
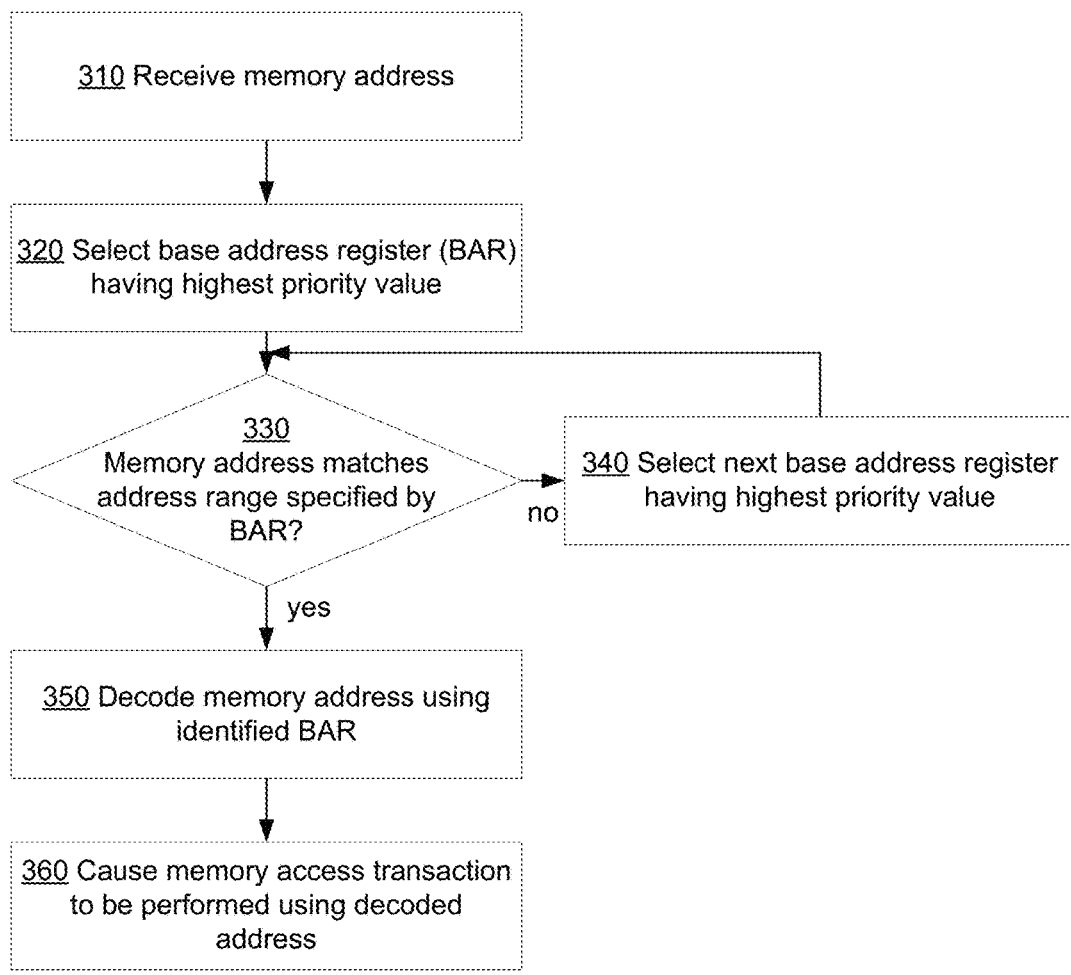
FIG. 3 illustrates a flow diagram of a method of memory address decoding prioritization in accordance with one or more aspects of the present disclosure.

FIG. 3 illustrates a flow diagram of a method of memory address decoding prioritization in accordance with one or more aspects of the present disclosure. Method 300 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one implementation, method 300 may be performed, at least in part, by the address decoding circuit 115 of FIGS. 1-2. For simplicity of explanation, the method 300 is depicted and described as a series of operations. However, the operations can be performed in various orders and/or concurrently and with other operations not presented and described herein. Furthermore, not all illustrated operations may be performed to implement the method 300.

Referring to FIG. 3, at block 310, an address decoding circuit performing the method may receive a memory address identified by a memory access transaction. In an illustrative example, the memory address may be asserted on the address bus by an agent initiating the transaction, as described in more detail herein above.

At blocks 320-330, the address decoding circuit may sequentially traverse a plurality of base address registers in the order of their respective decoding priorities. At block 320, the address decoding circuit may select the base address register having the highest priority among the plurality of base address registers.

Responsive to determining, at block 330, that the memory address specified by the memory access transaction falls within the address range specified by the base address register, the address decoding circuit may branch to block 350; otherwise the address decoding circuit may, at block 340, select the base address register having the highest priority among the remaining plurality of base address registers and loop back to block 330.

At block 350, the address decoding circuit may produce a decoded address by decoding the memory address using the identified base address register. In an illustrative example, the address decoding circuit may produce a device selector signal identifying a physical device associated with the identified base address register. The address decoding circuit may further produce a device offset signal specifying the offset within a local memory range of the identified physical device, by subtracting the base address specified by the identified base address register from the address identified by the memory access transaction, as described in more detail herein above.

At block 360, the address decoding circuit may causing the memory access transaction to be performed using the decoded address, and the method may terminate.

Figure 4A:
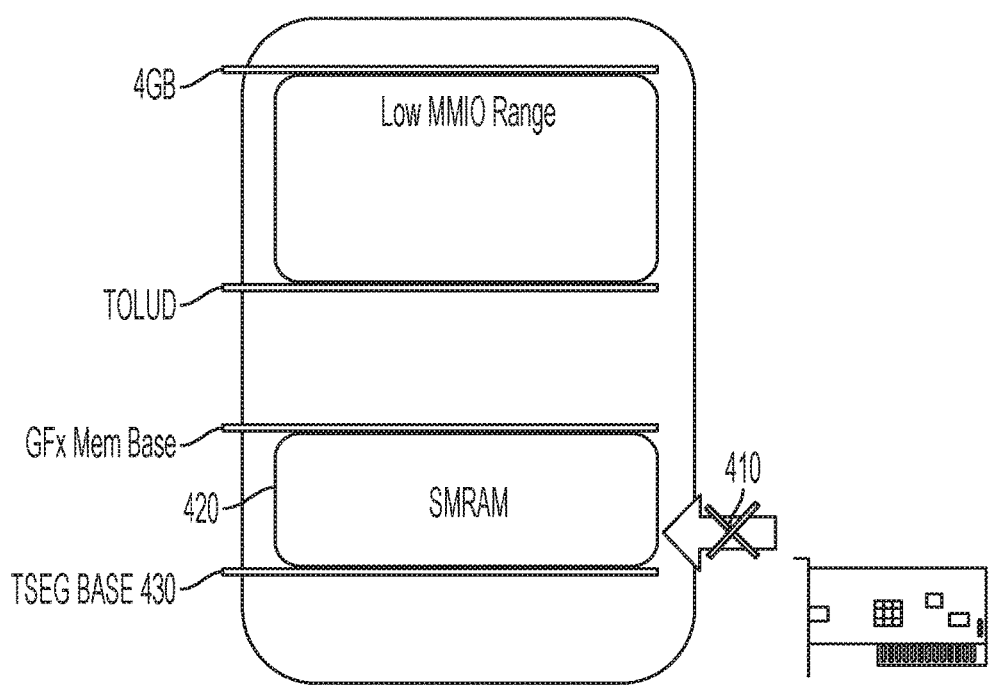
FIG. 4A schematically illustrates an example memory remapping attack exploiting a direct memory access (DMA) to the system management random access memory (SM-RAM)
Figure 4B:
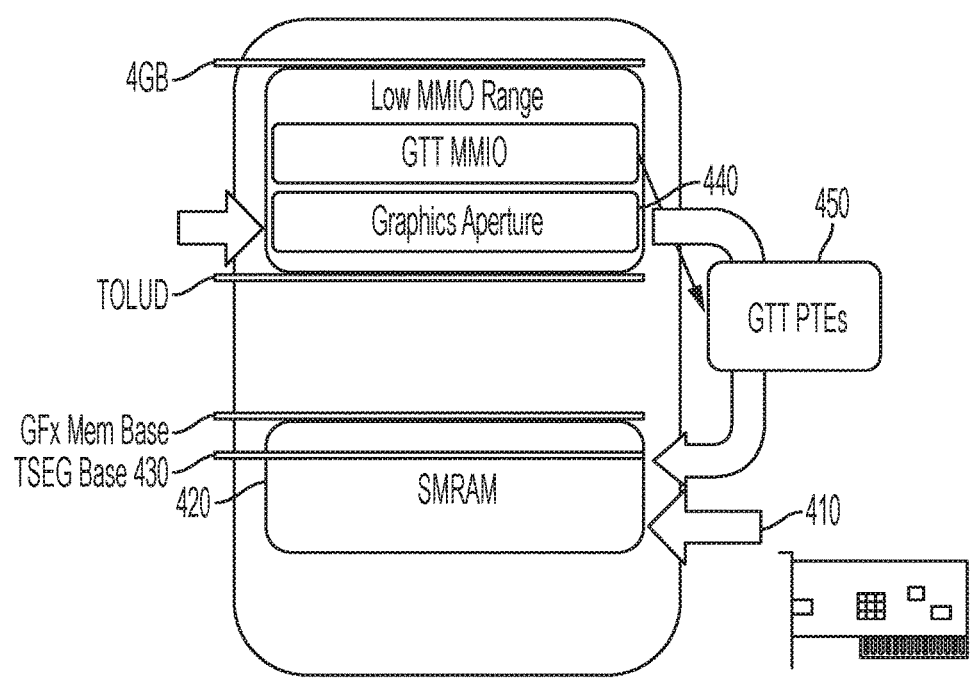
FIG. 4B schematically illustrates an example memory remapping attack by creation of overlapping ranges of the top segment (TSEG) and system management mode (SMM) registers.

FIGS. 4-5 schematically illustrate example configurations utilizing the systems and methods described herein for protecting against memory remapping attacks. As schematically illustrated by FIG. 4A, a direct memory access (DMA) 410 to the system management random access memory (SMRAM) 420 may be prevented since the top segment (TSEG) base 430 may be configured such that the TSEG would cover the SMRAM 420. However, an attacker may create overlapping ranges of the TSEG and system management mode (SMM) registers, as schematically illustrated by FIG. 4B. In the memory configuration of FIG. 4B, memory accesses to the graphics aperture 430 would be remapped to the SMRAM 420. Since the TSEG base 440 has been moved, the DMA access to the part of the SMRAM below the new TSEG base would not be blocked. The attack may be prevented utilizing the systems and methods of the present disclosure: the system management range register (SMRR) may be assigned the highest decoding priority, and thus the memory accesses utilizing the remapping 450 (created by graphic translation table page table entries (GTT PTEs)) would be decoded using the SMRR and therefore would be prevented.

Figure 5A:
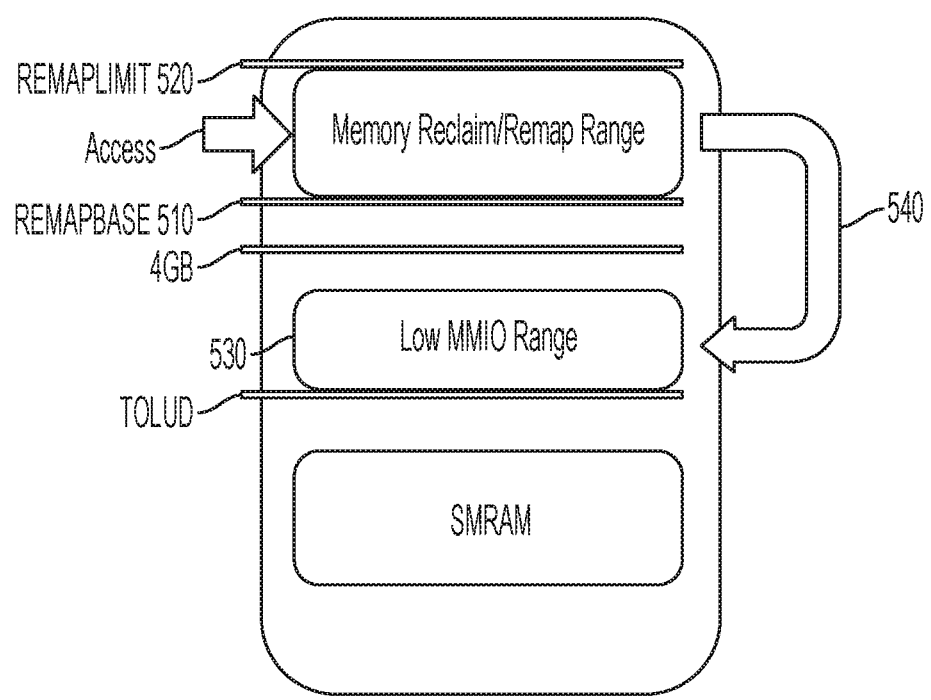
FIG. 5A schematically an example memory remapping attack by remapping a certain memory range to the low memory-mapped input-output (MMIO) range.
Figure 5B:
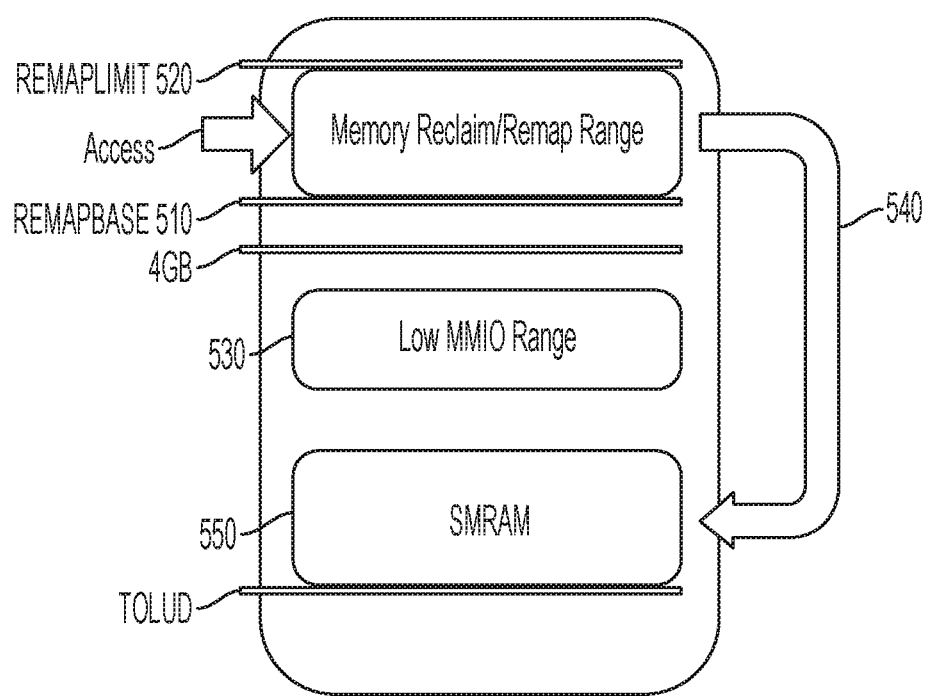
FIG. 5B schematically illustrates an example memory remapping attack by remapping a certain memory range to the SMRAM.

As schematically illustrated by FIG. 5A, memory accesses to a range limited by REMAPBASE address 510 and REMAPLIMIT address 520 may be remapped to the low memory-mapped input-output (MMIO) range 530. In the absence of decoding priority enforcement, an attacker may leverage the memory remapping capability to create the remapping 540 illustrated by FIG. 5B, such that the memory access to the range limited by REMAPBASE address 510 and REMAPLIMIT address 520 would be remapped to the SMRAM 550, rather than the Low MMIO range 530, thus compromising the SMRAM 550. The attack may be prevented utilizing the systems and methods of the present disclosure: the system management range register (SMRR) may be assigned the highest decoding priority, and thus the memory accesses utilizing the remapping 540 would be decoded using the SMRR and therefore would be prevented.

FIG. 6A is a block diagram illustrating an in-order pipeline and a register renaming stage, out-of-order issue/execution pipeline according to at least one implementation of the disclosure. FIG. 6B is a block diagram illustrating an in-order architecture core and a register renaming logic, out-of-order issue/execution logic to be included in a processor according to at least one implementation of the disclosure. The solid lined boxes in FIG. 6A illustrate the in-order pipeline, while the dashed lined boxes illustrates the register renaming, out-of-order issue/execution pipeline. Similarly, the solid lined boxes in FIG. 6B illustrate the in-order architecture logic, while the dashed lined boxes illustrates the register renaming logic and out-of-order issue/execution logic.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

In FIG. 6B, arrows denote a coupling between two or more units and the direction of the arrow indicates a direction of data flow between those units. FIG. 6B shows processor core 690 including a front end unit 630 coupled to an execution engine unit 650, and both are coupled to a memory unit 670.

The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to a level 2 (L2) cache unit 676 in the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 162 and a set of one or more memory access units 664. In certain implementations, a memory access unit may include an address decoding circuit 115 of FIG. 2 operating in accordance with one or more aspects of the present disclosure.

The execution units 662 may perform various operations (e.g., shifts, addition, subtraction, multiplication) and on various types of data (e.g., scalar floating point, packed integer, packed floating point, vector integer, vector floating point). While some implementations may include a number of execution units dedicated to specific functions or sets of functions, other implementations may include one execution unit or multiple execution units that all perform all functions. The scheduler unit(s) 656, physical register file(s) unit(s) 658, and execution cluster(s) 660 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary implementation, the memory access units 664 may include a load unit, a store address unit, and a store data unit, each of which is coupled to the data TLB unit 672 in the memory unit 670. The L2 cache unit 676 is coupled to one or more other levels of cache and eventually to a main memory. The L2 cache unit 676 may be set associative and may allow the locking of addresses, as described herein.

By way of example, the register renaming, out-of-order issue/execution core architecture may implement the pipeline 500 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

While register renaming is described in the context of out-of-order execution, it should be understood that register renaming may be used in an in-order architecture. While the illustrated implementation of the processor also includes a separate instruction and data cache units 634/674 and a shared L2 cache unit 676, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 7:
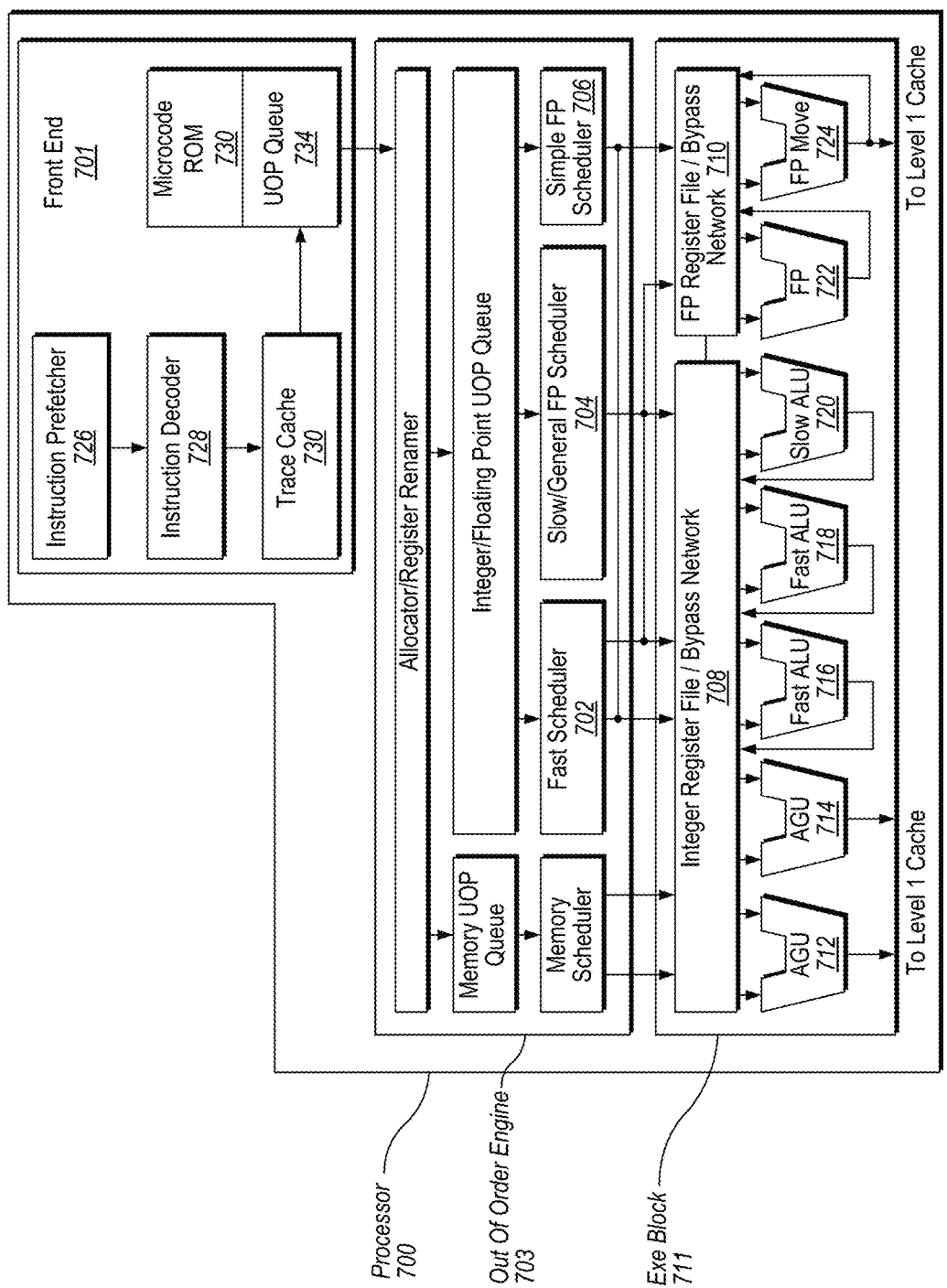
FIG. 7 is a block diagram of a processor operating in accordance with one or more aspects of the present disclosure.

FIG. 7 is a block diagram of the micro-architecture for a processor 700 that includes logic circuits to perform instructions in accordance with one implementation of the present disclosure. In some implementations, an instruction in accordance with one implementation may be implemented to operate on data elements having sizes of byte, word, doubleword, quadword, etc., as well as datatypes, such as single and double precision integer and floating point datatypes. In one implementation the in-order front end 701 is the part of the processor 700 that fetches instructions to be executed and prepares them to be used later in the processor pipeline. The front end 701 may include several units. In one implementation, the instruction prefetcher 726 fetches instructions from memory and feeds them to an instruction decoder 728 which in turn decodes or interprets them. For example, in one implementation, the decoder decodes a received instruction into one or more operations called "micro-instructions" or "micro-operations" (also called micro op or uops) that the machine may execute. In other implementations, the decoder parses the instruction into an opcode and corresponding data and control fields that are used by the micro-architecture to perform operations in accordance with one implementation. In one implementation, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one implementation, if more than four micro-ops are needed to complete an instruction, the decoder 728 accesses the microcode ROM 732 to do the instruction. For one implementation, an instruction may be decoded into a small number of micro ops for processing at the instruction decoder 728. In another implementation, an instruction may be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one implementation from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706 determine when a uop is ready to execute based on the readiness of their dependent input register operand sources and the availability of the execution resources the uops need to complete their operation. The fast scheduler 702 of one implementation may schedule on each half of the main clock cycle while the other schedulers may schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file 708, 710 for integer and floating point operations, respectively. Each register file 708, 710, of one implementation also includes a bypass network that may bypass or forward just completed results that have not yet been written into the register file to new dependent uops. The integer register file 708 and the floating point register file 710 are also capable of communicating data with the other. For one implementation, the integer register file 708 is split into two separate register files, one register file for the low order 32 bits of data and a second register file for the high order 32 bits of data. The floating point register file 710 of one implementation has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one implementation is comprised of a number of execution units: address generation unit (AGU) 712, AGU 714, fast ALU 716, fast ALU 718, slow ALU 720, floating point ALU 722, floating point move unit 724. For one implementation, the floating point execution blocks 722, 724, execute floating point, MMX, SIMD, and SSE, or other operations. The floating point ALU 722 of one implementation includes a 64 bit by 64 bit floating point divider to execute divide, square root, and remainder micro-ops. For implementations of the present disclosure, instructions involving a floating point value may be handled with the floating point hardware. In one implementation, the ALU operations go to the high-speed ALU execution units 716, 718. The fast ALUs 716, 718, of one implementation may execute fast operations with an effective latency of half a clock cycle. For one implementation, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one implementation, the integer ALUs 716, 718, 720 are described in the context of performing integer operations on 64 bit data operands. In alternative implementations, the ALUs 716, 718, 720 may be implemented to support a variety of data bits including 16, 32, 128, 756, etc. Similarly, the floating point units 722, 724 may be implemented to support a range of operands having bits of various widths. For one implementation, the floating point units 722, 724 may operate on 128 bits wide packed data operands in conjunction with SIMD and multimedia instructions.

In one implementation, the uops schedulers 702, 704, 706 dispatch dependent operations before the parent load has finished executing. As uops are speculatively scheduled and executed in processor 700, the processor 700 also includes logic to handle memory misses. If a data load misses in the data cache, there may be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 8:
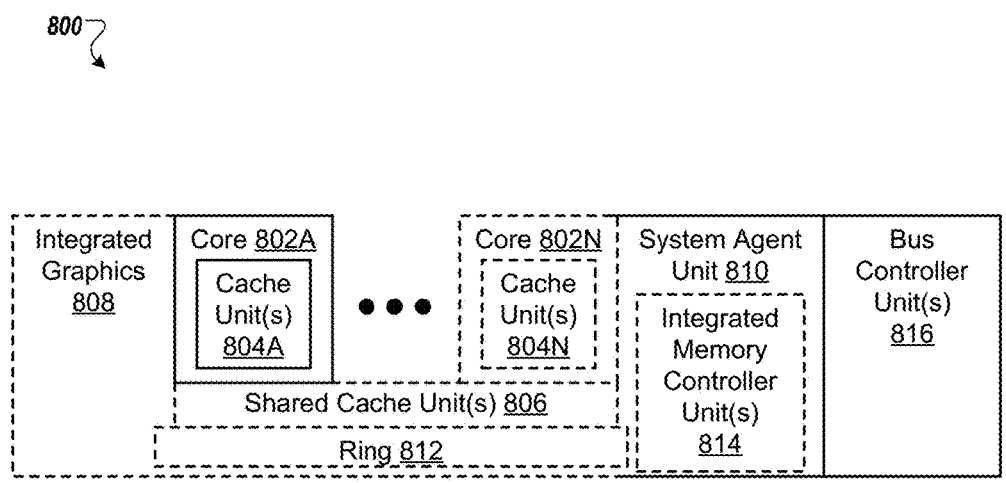
FIG. 8 is a block diagram of a processor operating in accordance with one or more aspects of the present disclosure.

FIG. 8 is a block diagram of a single core processor and a multicore processor 800 with integrated memory controller and graphics according to implementations of the disclosure. The solid lined boxes in FIG. 8 illustrate a processor 800 with a single core 802A, a system agent 810, a set of one or more bus controller units 816, while the addition of the dashed lined boxes illustrates an alternative processor 800 with multiple cores 802A-N, a set of one or more integrated memory controller unit(s) 814 in the system agent unit 810, and an integrated graphics logic 808. In certain implementations, the integrated memory controller unit(s) 814 may include an address decoding circuit 115 of FIG. 2 operating in accordance with one or more aspects of the present disclosure.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. This set of shared cache units 806 may be set associative and may allow the locking of addresses, as described herein. While in one implementation a ring based interconnect unit 812 interconnects the integrated graphics logic 808, the set of shared cache units 806, and the system agent unit 810, alternative implementations may use any number of well-known techniques for interconnecting such units.

In some implementations, one or more of the cores 802A-N are capable of multi-threading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing a subset of that instruction set or a different instruction set. As a further example, the cores may be different architecture.

The processor may include one or more different general-purpose processors, such as a Core™ i3, i5, i7, 2 Duo and Quad, Xeon™, Itanium™, Atom™, XScale™ or StrongARM™ processor, which are available from Intel Corporation, of Santa Clara, Calif. For example, one core may be a Core i7™ core while another core of the processor may be an Atom™ core. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 800 may be a part of and/or may be implemented on one or more substrates using any of a number of process technologies, such as, for example, BiCMOS, CMOS, or NMOS.

Figure 9:
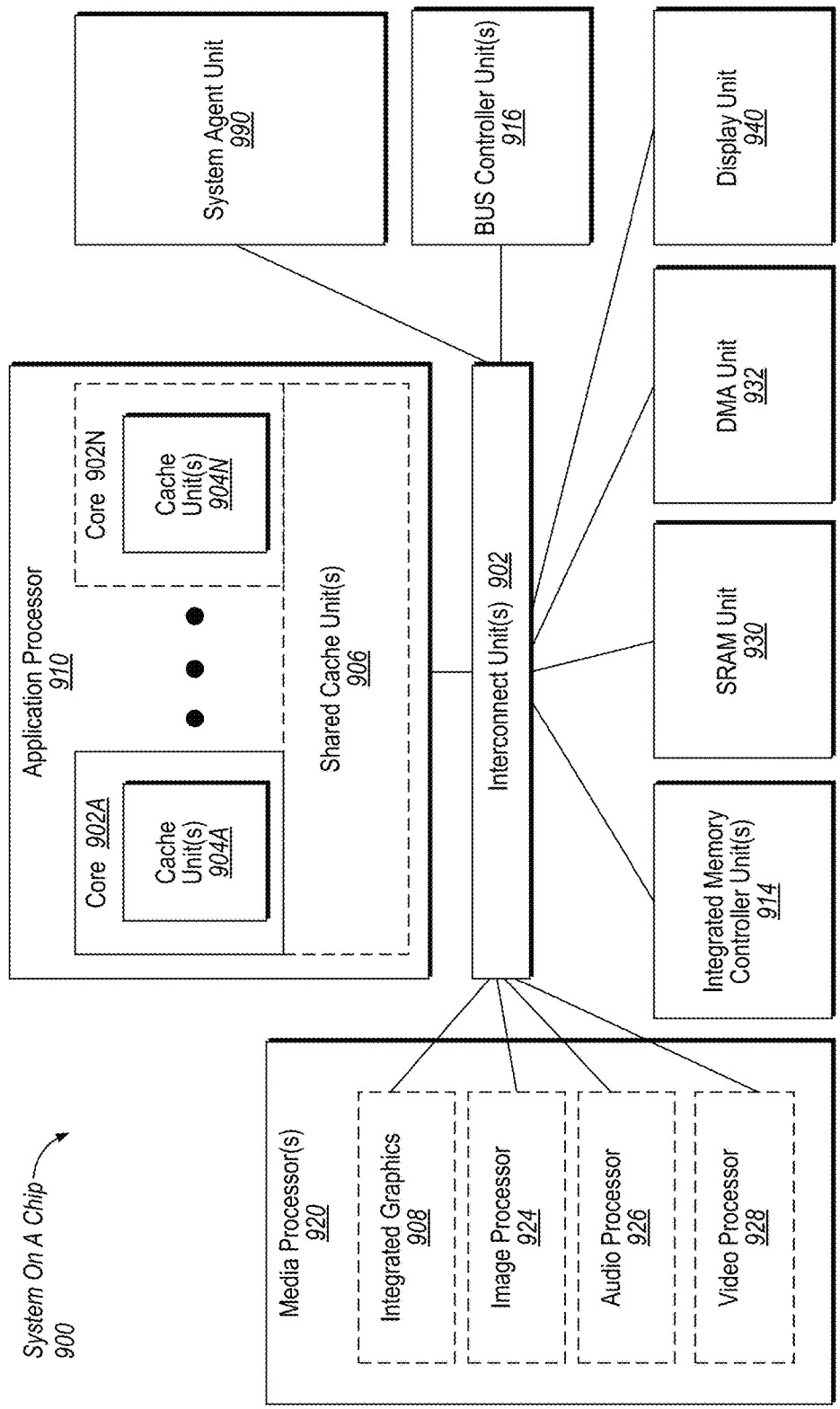
FIG. 9 is a block diagram of a system-on-a-chip operating in accordance with one or more aspects of the present disclosure.

Referring now to FIG. 9, shown is a block diagram of a SoC 900 in accordance with an implementation of the present disclosure. Similar elements in FIG. 9 bear like reference numerals. Also, dashed lined boxes are features on more advanced SoCs. In FIG. 9, an interconnect unit(s) 902 is coupled to: an application processor 910 which includes a set of one or more cores 902A-N and shared cache unit(s) 906; a system agent unit 990; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays. In certain implementations, the integrated memory controller unit(s) 914 may include an address decoding circuit 115 of FIG. 2 operating in accordance with one or more aspects of the present disclosure.

Figure 10:
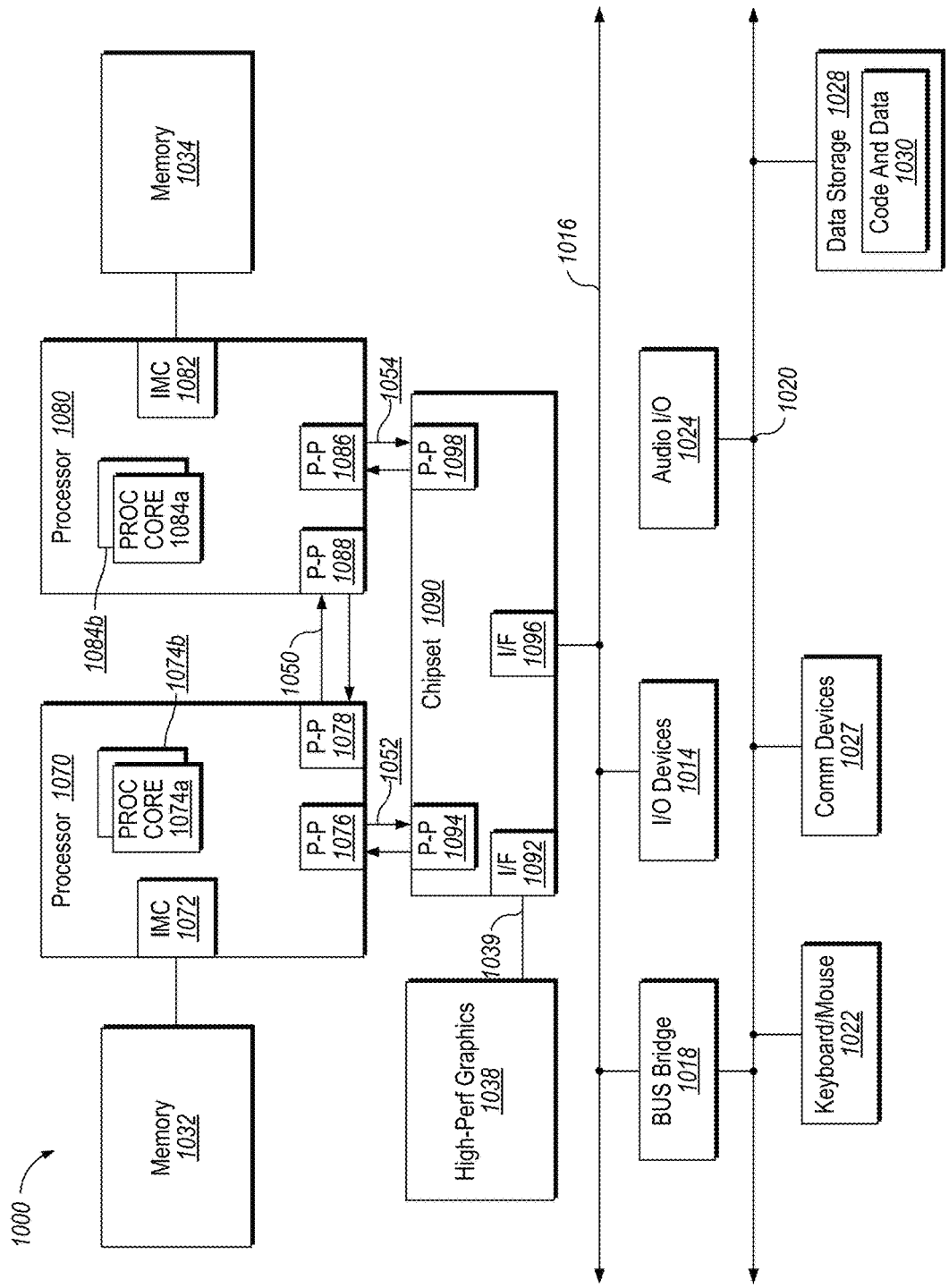
FIG. 10 is a block diagram of a computer system operating in accordance with one or more aspects of the present disclosure.

Examples of the present disclosure may be implemented in many different system types. Referring now to FIG. 10, shown is a block diagram of a multiprocessor system 1000 in accordance with some implementations. As shown in FIG. 10, multiprocessor system 1000 is a point-to-point interconnect system, and includes a first processor 1070 and a second processor 1080 coupled via a point-to-point interconnect 1050. As shown in FIG. 10, each of processors 1070 and 1080 may be multicore processors, including first and second processor cores (i.e., processor cores 1074a and 1074b and processor cores 1084a and 1084b), although potentially many more cores may be present in the processors. The processors each may include hybrid write mode logics in accordance with an implementation of the present.

While shown with two processors 1070, 1080, it is to be understood that the scope of the present disclosure is not so limited. In other implementations, one or more additional processors may be present in a given processor.

Processors 1070 and 1080 are shown including integrated memory controller units 8102 and 8102, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, integrated memory controllers (IMCs) 1072 and 1082 couple the processors to respective memories, namely a memory 1032 and a memory 1034, which may be portions of main memory locally attached to the respective processors. In certain implementations, the IMCs 1072 and 1082 may include an address decoding circuit 115 of FIG. 2 operating in accordance with one or more aspects of the present disclosure.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one implementation, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 may be coupled to first bus 1016, along with a bus bridge 1018 which couples first bus 1016 to a second bus 1020. In one implementation, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one implementation. Further, an audio I/O 1024 may be coupled to second bus 1020. Note that other architectures are possible. For example, instead of the point-to-point architecture of FIG. 10, a system may implement a multi-drop bus or other such architecture.

Figure 11:
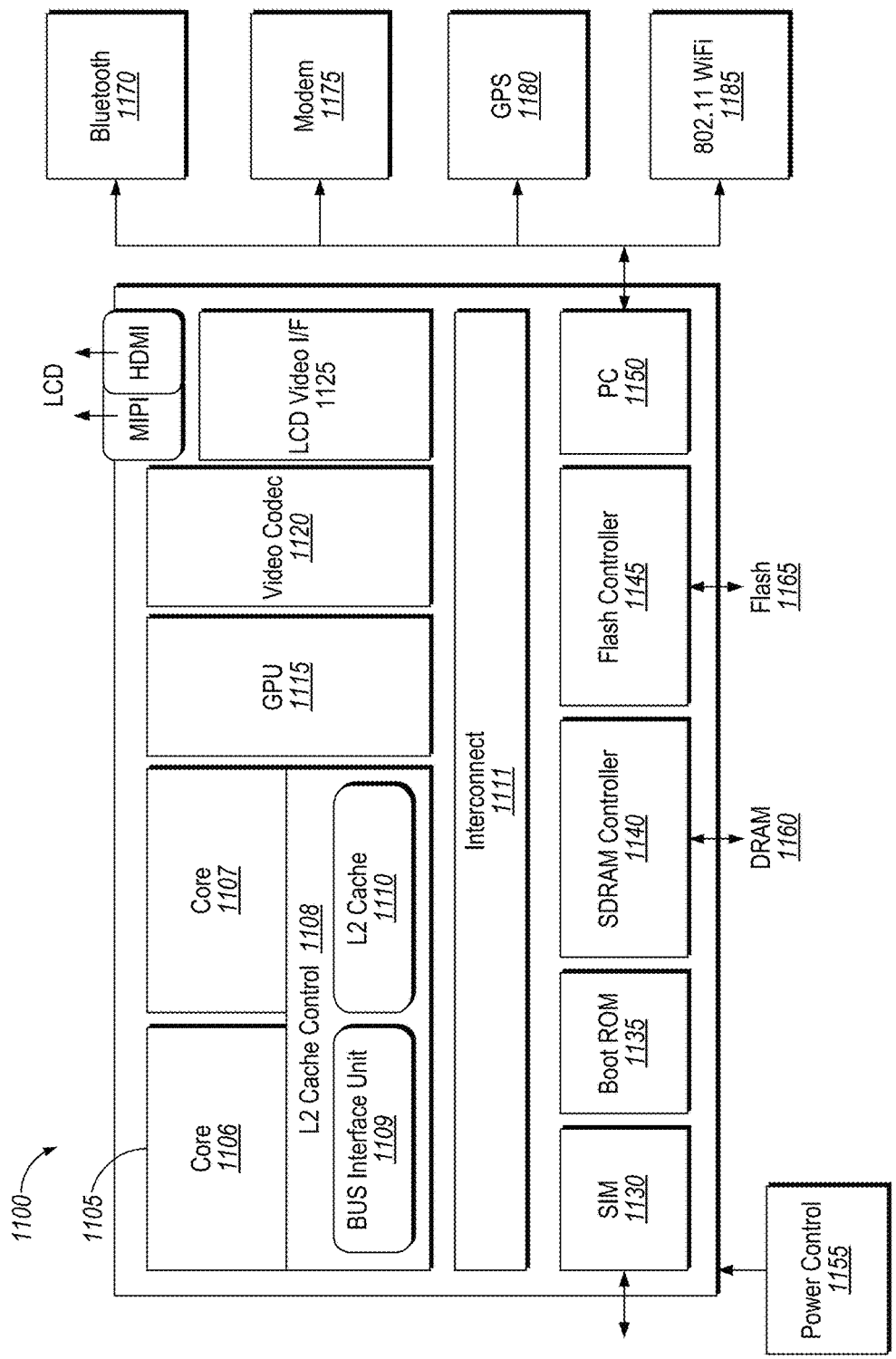
FIG. 11 illustrates another example block diagram for a computing system operating in accordance with one or more aspects of the present disclosure.

Turning next to FIG. 11, an implementation of a system on-chip (SOC) design in accordance with implementations of the disclosure is depicted. As an illustrative example, SOC 1100 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which may correspond in nature to a mobile station (MS) in a GSM network.

Here, SOC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which may implement one or more aspects of the described disclosure.

Interconnect 1111 provides communication channels to the other components, such as a Subscriber Identity Module (SIM) 1130 to interface with a SIM card, a boot rom 1135 to hold boot code for execution by cores 1106 and 1107 to initialize and boot SOC 1100, an SDRAM controller 1140 to interface with external memory (e.g. DRAM 1160), a flash controller 1145 to interface with persistent or non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the implementations described herein. In certain implementations, the SDRAM controller 1140 may include an address decoding circuit 115 of FIG. 2 operating in accordance with one or more aspects of the present disclosure.

In addition, the system illustrates peripherals for communication, such as a Bluetooth module 1170, modem 1175 (e.g., 3G, 4G, Long Term Evolution (LTE), LTE-Advanced, etc.), GPS 1180, Wi-Fi 1185, Zigbee (not shown), and Z-Wave (not shown). Note as stated above, a UE includes a radio for communication. As a result, these peripheral communication modules may not all be included. However, in a UE some form of a radio for external communication should be included.

Figure 12:
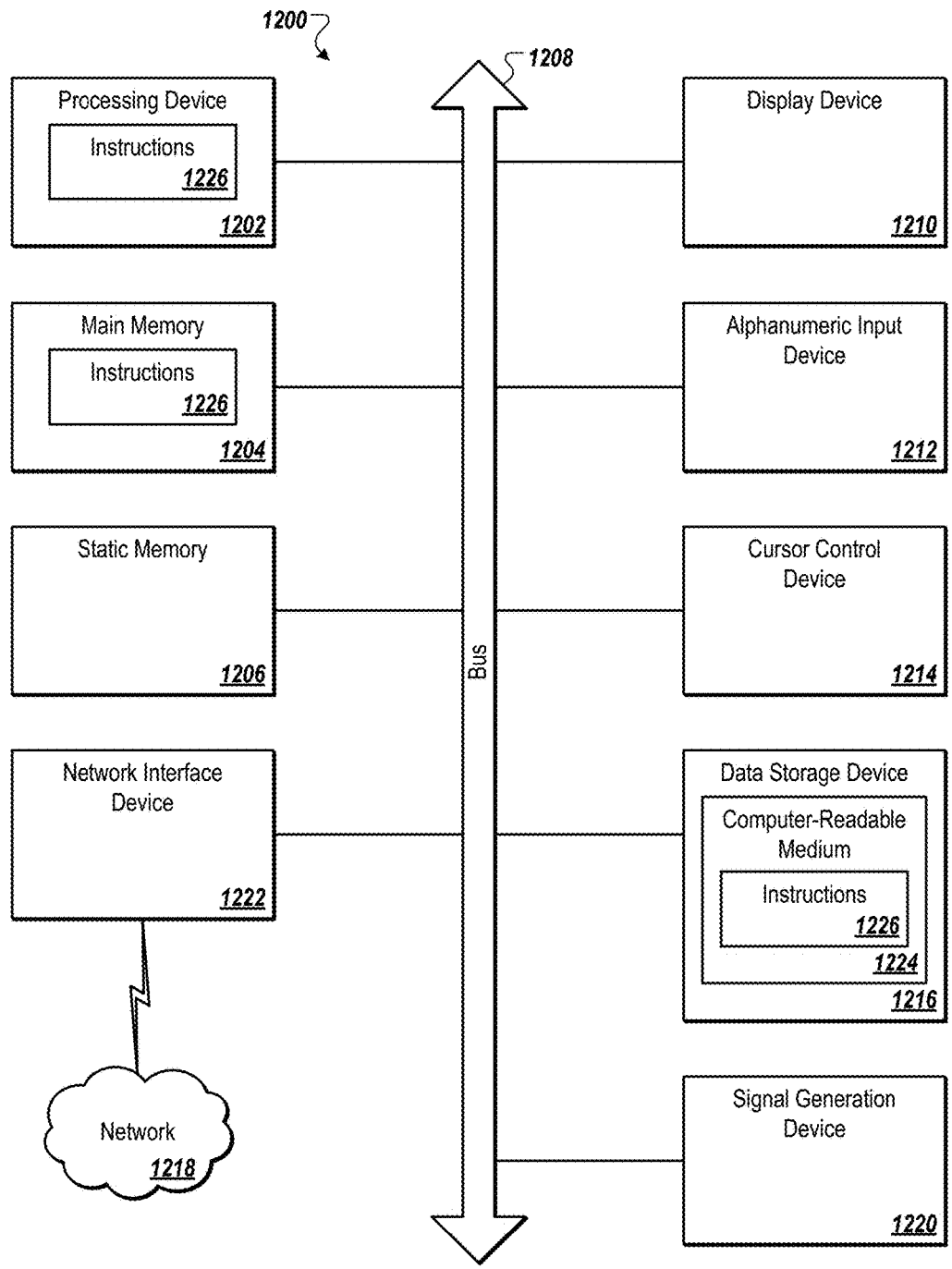
FIG. 12 illustrates a diagrammatic representation of a machine in the example form of a computing system operating in accordance with one or more aspects of the present disclosure.

FIG. 12 illustrates a diagrammatic representation of a machine in the example form of a computing system 1200 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a game console, a cellular telephone, a digital camera, a handheld PC, a web appliance, a server, a network router, switch or bridge, micro controller, a digital signal processor (DSP), system on a chip, network computers (NetPC), network hubs, wide area network (WAN) switches, or any machine capable of executing a set of instructions (sequential or otherwise) that specify actions to be taken by that machine. Further, while only a single machine is illustrated for the system architecture 100, the term "machine" shall also be taken to include any collection of machines that individually or jointly execute a set (or multiple sets) of instructions to perform any one or more of the methodologies discussed herein. Implementations are not limited to computer systems.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1216, which communicate with each other via a bus 1208.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one implementation, processing device 1202 may include one or processing cores. The processing device 1202 is configured to execute the instructions 1226 for performing the methods described herein. In certain implementations, the computing system 1200 may include various components described herein, e.g., the address decoding circuit 150 of FIG. 2. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Computing system 1200 is representative of processing systems based on the PENTIUM III™, PENTIUM 4™, Celeron™, Xeon™, Itanium, XScale™, StrongARM™, Core™, Core 2™, Atom™, and/or Intel® Architecture Core™, such as an i3, i5, i7 microprocessors available from Intel Corporation of Santa Clara, Calif., although other systems (including PCs having other microprocessors, engineering workstations, set-top boxes and the like) may also be used. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other implementations such as an Apple A5/A6 processor, a Qualcomm Snapdragon processor, or TI OMAP processor. In one implementation, processing device 1202 executes a version of the WINDOWS™ operating system available from Microsoft Corporation of Redmond, Wash., although other operating systems (OS X, UNIX, Linux, Android, iOS, Symbian, for example), embedded software, and/or graphical user interfaces, may also be used. Thus, implementations of the present disclosure are not limited to any specific combination of hardware circuitry and software. One implementation may be described in the context of a single processor desktop or server system, but alternative implementations may be included in a multiprocessor system. Computing system 1200 may be an example of a 'hub' system architecture.

The computing system 1200 may further include a network interface device 1222 communicably coupled to a network 1218. The computing system 1200 also may include a display device 1210 (e.g., a liquid crystal display (LCD) or a cathode ray tube (CRT)), an alphanumeric input device 1212 (e.g., a keyboard), a cursor control device 1214 (e.g., a mouse), a signal generation device 1220 (e.g., a speaker), or other peripheral devices. Furthermore, computing system 1200 may include a graphics processing unit (not illustrated), a video processing unit (not illustrated) and an audio processing unit (not illustrated). In another implementation, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1216 may include a computer-readable storage medium 1224 on which is stored instructions 1226 embodying any one or more of the methodologies of functions described herein. The instructions 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1A, and/or a software library containing methods that call the above applications. While the computer-readable storage medium 1224 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present implementations. The term "computer-readable storage medium" shall accordingly be taken to include, but not be limited to, solid-state memories, and optical and magnetic media.

While the present disclosure has been described with respect to a limited number of implementations, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The implementations are described with reference to hybrid-threading in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the present disclosure may be applied to other types of circuits or semiconductor devices that may benefit from higher pipeline throughput and improved performance. The teachings of implementations of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the present disclosure rather than to provide an exhaustive list of all possible implementations of implementations of the present disclosure.

Although the below examples describe instruction handling and distribution in the context of execution units and logic circuits, other implementations of the present disclosure may be accomplished by way of a data or instructions stored on a machine-readable, tangible medium, which when performed by a machine cause the machine to perform functions consistent with at least one implementation of the disclosure. In one implementation, functions associated with implementations of the present disclosure are embodied in machine-executable instructions. The instructions may be used to cause a general-purpose or special-purpose processor that is programmed with the instructions to perform the steps of the present disclosure. Implementations of the present disclosure may be provided as a computer program product or software which may include a machine or computer-readable medium having stored thereon instructions which may be used to program a computer (or other electronic devices) to perform one or more operations according to implementations of the present disclosure. Alternatively, operations of implementations of the present disclosure might be performed by specific hardware components that contain fixed-function logic for performing the operations, or by any combination of programmed computer components and fixed-function hardware components.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Hexadecimal values may also be represented with a prefix, such as "0x." Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Reference throughout this specification to "one implementation" or "an implementation" means that a particular feature, structure, or characteristic described in connection with the implementation is included in at least one implementation of the present disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the present specification, a detailed description has been given with reference to specific example implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

The following examples pertain to further implementations.

Example 1 is a processing system, comprising: a plurality of base address registers, wherein each base address registers specifies an address range and a decoding priority associated with the address range; and an address decoding circuit coupled to the plurality of base address registers, the address decoding circuit to: receive a memory address identified by a memory access transaction, and produce a decoded address by decoding the memory address using the plurality of base address registers in an order of respective decoding priorities.

Example 2 is the processing system of Example 1, in which the address decoding circuit is further to cause the memory access transaction to be performed using the decoded address.

Example 3 is the processing system of Example 1, in which the address range is identified by a base address and a size of the address range.

Example 4 is the processing system of Example 1, in which decoding the memory address further comprises: identifying a base address registers associated with an address range including the memory address specified by the memory access transaction.

Example 5 is the processing system of Example 1, in which decoding the memory address further comprises: sequentially traversing the plurality of base address registers in the order of their respective decoding priorities until a matching base address register is identified such that the memory address specified by the memory access transaction falls within an address range specified by the matching base address register.

Example 6 is the processing system of Example 5, in which decoding the memory address further comprises: producing a device selector signal identifying a physical device associated with the identified base address register; subtracting the base address specified by the identified base address register from the address identified by the memory access transaction; and producing a device offset signal specifying an offset within a local memory range of the identified physical device.

Example 7 is the processing system of any of Examples 1-5, in which two or more base address registers of the plurality of base address registers specify overlapping address ranges.

Example 8 is the processing system of any of Examples 1-5, in which the highest decoding priority is assigned to address ranges associated with a security-sensitive physical device.

Example 9 is the processing system of any of Examples 1-5, in which the highest decoding priority is assigned to address ranges associated with a security-sensitive processor mode of operation.

Example 10 is a system-on-chip (SoC), comprising: a plurality of base address registers, wherein each base address registers specifies an address range and a decoding priority associated with the address range; and an address decoding circuit coupled to the plurality of base address registers, the address decoding circuit to: receive a memory address identified by a memory access transaction; produce a decoded address by decoding the memory address using the plurality of base address registers in an order of respective decoding priorities; and cause the memory access transaction to be performed using the decoded address.

Example 11 is the SoC of Example 10, in which the address range is identified by a base address and a size of the address range.

Example 12 is the SoC of Example 10, in which decoding the memory address further comprises: identifying a base address registers associated with an address range including the memory address specified by the memory access transaction.

Example 13 is the SoC of Example 10, in which decoding the memory address further comprises: sequentially traversing the plurality of base address registers in the order of their respective decoding priorities until a matching base address register is identified such that the memory address specified by the memory access transaction falls within an address range specified by the matching base address register.

Example 14 is the SoC of Example 10, in which decoding the memory address further comprises: producing a device selector signal identifying a physical device associated with the identified base address register; subtracting the base address specified by the identified base address register from the address identified by the memory access transaction; and producing a device offset signal specifying an offset within a local memory range of the identified physical device.

Example 15 is the SoC of any of Examples 10-13, in which two or more base address registers of the plurality of base address registers specify overlapping address ranges.

Example 16 is the SoC of any of Examples 10-13, in which the highest decoding priority is assigned to address ranges associated with a security-sensitive physical device.

Example 17 is the SoC of any of Examples 10-13, in which the highest decoding priority is assigned to address ranges associated with a security-sensitive processor mode of operation.

Example 18 is a method comprising: receiving, by an address decoding circuit, a memory address identified by a memory access transaction; accessing one or more base address registers of a plurality of base address registers, wherein each base address registers specifies an address range and a decoding priority associated with the address range; sequentially traversing the plurality of base address registers in the order of their respective decoding priorities until a matching base address register is identified such that the memory address specified by the memory access transaction falls within an address range specified by the matching base address register; and producing a device selector signal identifying a physical device associated with the identified base address register.

Example 19 is the method of Example 18, in which the address range is identified by a base address and a size of the address range.

Example 20 is the method of Example 18, in which decoding the memory address further comprises: identifying a base address registers associated with an address range including the memory address specified by the memory access transaction.

Example 21 is the method of Example 18, in which decoding the memory address further comprises: subtracting the base address specified by the identified base address register from the address identified by the memory access transaction, producing a device selector signal identifying a physical device associated with the identified base address register; and causing the memory access transaction to be performed using the decoded address.

Example 22 is the method of any of Examples 18-21, in which two or more base address registers of the plurality of base address registers specify overlapping address ranges.

Example 23 is the method of any of Examples 18-21, in which the highest decoding priority is assigned to address ranges associated with a security-sensitive physical device.

Example 24 is the method of any of Examples 18-21, in which the highest decoding priority is assigned to address ranges associated with a security-sensitive processor mode of operation.

Example 25 is an apparatus comprising means for performing the method of any of Examples 17-24.

Example 26 is a computer-readable non-transitory storage medium having stored thereon executable instructions that, when executed by a processing system, perform operations comprising: receiving, by an address decoding circuit, a memory address identified by a memory access transaction; produce a decoded address by decoding the memory address using a plurality of base address registers, wherein each base address registers specifies an address range and a decoding priority associated with the address range; and causing the memory access transaction to be performed using the decoded address.

Example 27 is a computer-readable non-transitory storage medium of Example 26, in which the address range is identified by a base address and a size of the address range.

Example 28 is a computer-readable non-transitory storage medium of Example 26, in which decoding the memory address further comprises: identifying a base address registers associated with an address range including the memory address specified by the memory access transaction.

Example 29 is a computer-readable non-transitory storage medium of Example 26, in which decoding the memory address further comprises: sequentially traversing the plurality of base address registers in the order of their respective decoding priorities until a matching base address register is identified such that the memory address specified by the memory access transaction falls within an address range specified by the matching base address register.

Example 30 is a computer-readable non-transitory storage medium of Example 29, in which decoding the memory address further comprises: producing a device selector signal identifying a physical device associated with the identified base address register; subtracting the base address specified by the identified base address register from the address identified by the memory access transaction; and producing a device offset signal specifying an offset within a local memory range of the identified physical device.

Example 31 is a computer-readable non-transitory storage medium of any of Examples 26-30, in which two or more base address registers of the plurality of base address registers specify overlapping address ranges.

Example 32 is a computer-readable non-transitory storage medium of any of Examples 26-30, in which the highest decoding priority is assigned to address ranges associated with a security-sensitive physical device.

Example 33 is a computer-readable non-transitory storage medium of any of Examples 26-30, in which the highest decoding priority is assigned to address ranges associated with a security-sensitive processor mode of operation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," "monitoring," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

The invention claimed is:

1. A processing system, comprising:
a plurality of base address registers, wherein each base address registers specifies an address range and a decoding priority associated with the address range, wherein the decoding priority is configurable by device driver software running on the processing system; and
an address decoding circuit coupled to the plurality of base address registers, the address decoding circuit to:
receive a memory address identified by a memory access transaction, and
produce a decoded address by decoding the memory address using the plurality of base address registers in an order of respective decoding priorities.
2. The processing system of claim 1, wherein the address decoding circuit is further to:
cause the memory access transaction to be performed using the decoded address.
3. The processing system of claim 1, wherein the address range is identified by a base address and a size of the address range.
4. The processing system of claim 1, wherein decoding the memory address further comprises:
identifying a base address register associated with an address range including the memory address specified by the memory access transaction.
5. The processing system of claim 1, wherein decoding the memory address further comprises:
sequentially traversing the plurality of base address registers in the order of their respective decoding priorities until a matching base address register is identified such that the memory address specified by the memory access transaction falls within an address range specified by the matching base address register.
6. The processing system of claim 5, wherein decoding the memory address further comprises:
producing a device selector signal identifying a physical device associated with the identified base address register;
subtracting the base address specified by the identified base address register from the address identified by the memory access transaction; and
producing a device offset signal specifying an offset within a local memory range of the identified physical device.
7. The processing system of claim 1, wherein two or more base address registers of the plurality of base address registers specify overlapping address ranges.
8. The processing system of claim 1, wherein a highest decoding priority is assigned to address ranges associated with a security-sensitive physical device.
9. The processing system of claim 1, wherein a highest decoding priority is assigned to address ranges associated with a security-sensitive processor mode of operation.
10. A system-on-chip (SoC), comprising:
a plurality of base address registers, wherein each base address registers specifies an address range and a decoding priority associated with the address range; and
an address decoding circuit coupled to the plurality of base address registers, the address decoding circuit to:
receive a memory address identified by a memory access transaction;
produce a decoded address by decoding the memory address using the plurality of base address registers in an order of respective decoding priorities, wherein the decoding priorities are configurable by device driver software running on the SoC;
and cause the memory access transaction to be performed using the decoded address.
11. The SoC of claim 10, wherein the address range is identified by a base address and a size of the address range.
12. The SoC of claim 10, wherein decoding the memory address further comprises:
identifying a base address register associated with an address range including the memory address specified by the memory access transaction.
13. The SoC of claim 10, wherein decoding the memory address further comprises:
sequentially traversing the plurality of base address registers in the order of their respective decoding priorities until a matching base address register is identified such that the memory address specified by the memory access transaction falls within an address range specified by the matching base address register.

14. The SoC of claim 13, wherein decoding the memory address further comprises:
   producing a device selector signal identifying a physical device associated with the identified base address register;
   subtracting the base address specified by the identified base address register from the address identified by the memory access transaction; and
   producing a device offset signal specifying an offset within a local memory range of the identified physical device.

15. The SoC of claim 10, wherein two or more base address registers of the plurality of base address registers specify overlapping address ranges.

16. The SoC of claim 10, wherein a highest decoding priority is assigned to address ranges associated with one of: a security-sensitive physical device or a security-sensitive processor mode of operation.

17. A method comprising:
   receiving, by an address decoding circuit, a memory address identified by a memory access transaction;
   accessing one or more base address registers of a plurality of base address registers, wherein each base address registers specifies an address range and a decoding priority associated with the address range, wherein the decoding priority is configurable by device driver software;
   sequentially traversing the plurality of base address registers in the order of their respective decoding priorities until a matching base address register is identified such that the memory address specified by the memory access transaction falls within an address range specified by the matching base address register; and
   producing a device selector signal identifying a physical device associated with the identified base address register.

18. The method of claim 17, wherein the address range is identified by a base address and a size of the address range.

19. The method of claim 18, wherein decoding the memory address further comprises:
   identifying a base address register associated with an address range including the memory address specified by the memory access transaction.

20. The method of claim 17, wherein decoding the memory address further comprises:
   subtracting the base address specified by the identified base address register from the address identified by the memory access transaction;
   producing a device offset signal specifying an offset within a local memory range of the identified physical device; and
   causing the memory access transaction to be performed using the decoded address.

* * * * *